United States Patent [19]

Morelli

[11] Patent Number: 4,705,626

[45] Date of Patent: * Nov. 10, 1987

[54] MAGNETIC OIL FILTER MODULE

[76] Inventor: Aldo Morelli, 25 Rockwood Ter., Jamaica Plain, Mass. 02130

[*] Notice: The portion of the term of this patent subsequent to May 5, 2004 has been disclaimed.

[21] Appl. No.: 841,303

[22] Filed: Mar. 19, 1986

[51] Int. Cl.⁴ .................. B01D 35/06; B01D 27/10; B03C 1/02
[52] U.S. Cl. .................. 210/130; 210/223; 210/489; 210/497.01; 210/499
[58] Field of Search .......... 55/100; 210/130, 222, 210/223, 295, 695, 489, 497.01, 499; 123/196 A

[56] References Cited

U.S. PATENT DOCUMENTS

| | | | |
|---|---|---|---|
| 2,983,384 | 5/1961 | Winslow | 210/223 X |
| 3,313,416 | 4/1967 | Rosaen | 210/223 X |
| 3,342,339 | 9/1967 | Riolo | 210/223 |
| 4,026,805 | 5/1977 | Fowler | 210/223 |
| 4,495,068 | 1/1985 | Rosaen | 210/223 X |

Primary Examiner—Richard V. Fisher
Assistant Examiner—W. Gary Jones
Attorney, Agent, or Firm—Robert T. Gammons

[57] ABSTRACT

A filter module for removing metallic sludge from lubricating oil used in automobile engine crankcases and transmissions embodying permanent magnets for intercepting and retaining magnetizable sludge and a filter cloth for intercepting and retaining non-magnetizable sludge.

7 Claims, 5 Drawing Figures

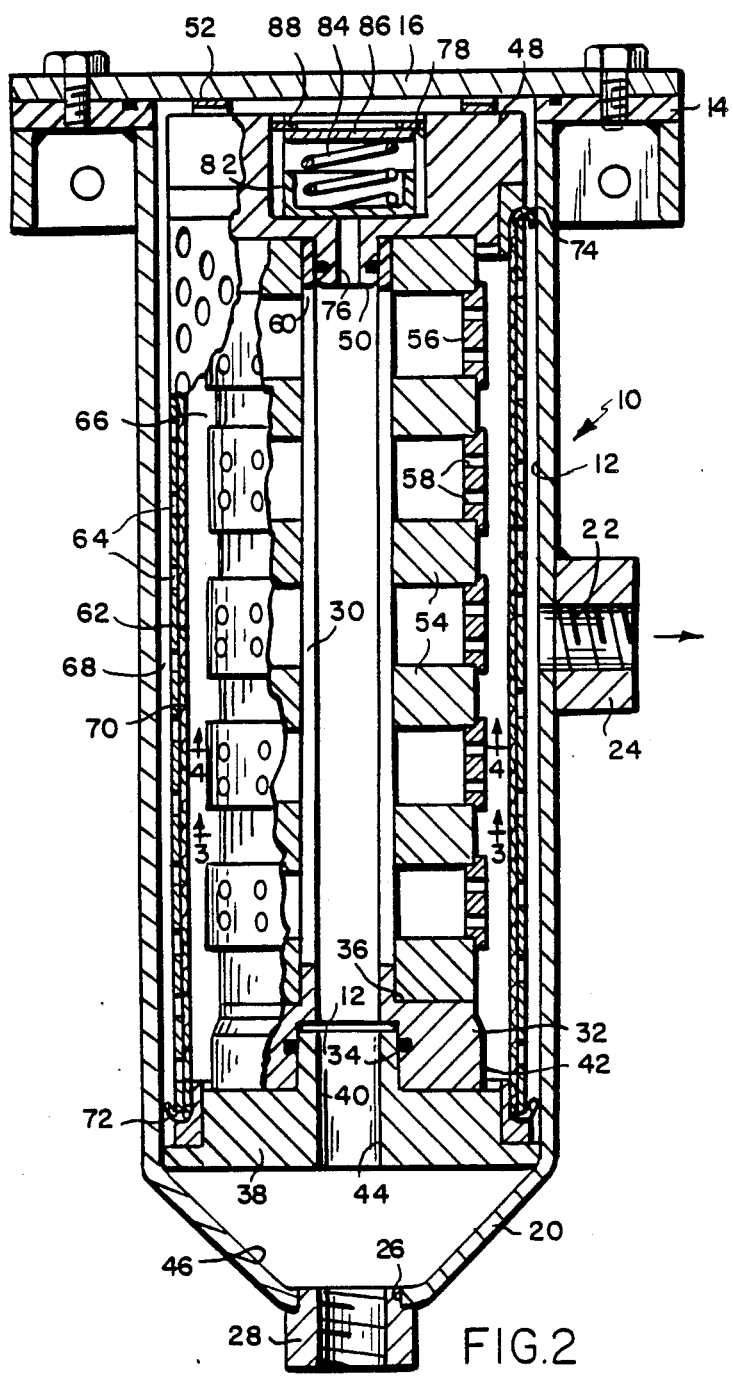
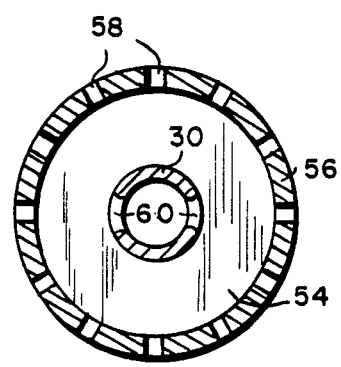
FIG. 4
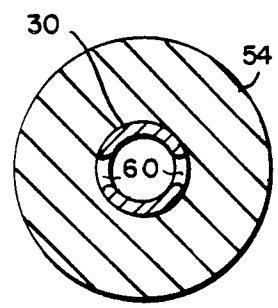
FIG. 3
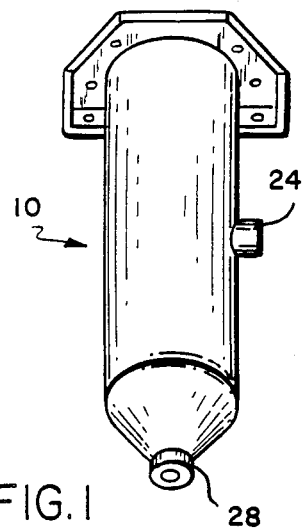
FIG. 1
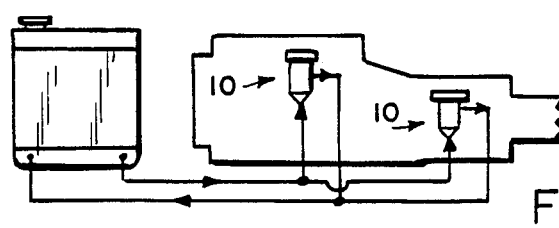
FIG. 5

MAGNETIC OIL FILTER MODULE

BACKGROUND OF THE INVENTION

In my pending application, Ser. No. 795,918, filed Nov. 7, 1985, there is a disclosed a filter module designed specifically for the purpose of removing metal sludge from the oil in the hydraulic system of power shovels and the like. It is the purpose of this invention to so modify the aforesaid filter module as to accommodate it to filtering oil in automobile engine crankcases and transmissions.

SUMMARY OF THE INVENTION

The filter module herein illustrated comprises a housing defining an enclosure, a filter element supported in the enclosure comprising an elongate cartridge of uniform cross section defining a chamber open at one end and closed at the other end, at least two slots longitudinally of the cartridge at diametrically-opposed sides of its longitudinal axis a plurality of permanent magnets disposed about the cartridge in longitudinally-spaced relation, a plurality of non-magnetic spacers disposed about the cartridge between the permanent magnets, said spacers containing openings in communication with the slots at the inner ends and in communication with the surrounding enclosure at their outer ends, a rigid perforate sleeve disposed about the magnets and spacers of such cross section as to provide a gap between the outer sides of the magnets and spacers and the inner side of the perforate sleeve and a porous fabric sleeve disposed in said gap, means at one end of the cartridge for delivering oil into the interior of the cartridge and means intermediate the ends of the enclosure for removing filtered oil from the enclosure. The rigid sleeve is preferably a metal sleeve containing a plurality of perforations and the fabric sleeve is comprised of a woven, felted or napped material. Desirably, the enclosure is in the form of a cylinder of circular cross section dimensioned to receive the cartridge with a gap between the exterior of the cartridge and the interior of the cylinder. The module is so structured as to enable removing the cartridge from the cylinder, removing the rigid metal sleeve from the cartridge and removing the fabric sleeve and replacing the latter.

The invention will now be described in greater detail with reference to the accompanying drawings, wherein:

FIG. 1 is an isometric of the filter module constructed according to this invention;

FIG. 2 is an enlarged diametrical section with parts shown in elevation of the module shown in FIG. 1;

FIG. 3 is a transverse section taken on the line 3—3 of FIG. 2;

FIG. 4 is a transverse section on the line 4—4 of FIG. 2; and

FIG. 5 diagrammatically illustrates the use of the module in connection with an internal water cooling automobile engine.

Referring to the drawings, the module comprises a cylindrical housing 10 defining an internal cylindrical chamber 12. The upper end of the housing 10 has fixed to it a peripheral flange 14 to which there is bolted a cover plate 16. The lower end of the cylinder 10 is provided with a conical closure member 20. An opening 22 is provided in the side wall intermediate the ends over which there is welded a threaded coupling element 24. The conical end member 20 is provided with an opening 26 in which is welded a threaded coupling 28.

Within the housing 10, there is mounted a filter assembly comprising a centrally-located, tubular cartridge 30 substantially coextensive in length with the housing 10, the lower end of which is provided with a base 32 of circular cross section having at its lower side a recess 34 of circular cross section concentric with the axis of the cartridge 30 and at its upper side an annular, flat surface 36. The base 32 at the lower end of the cartridge 30 is supported within the chamber 12 by a support 38 of circular cross section which has at its upper side a boss 40 which fits into the recess 34 at the lower side of the base 32 and a flat, annular surface 42 on which rests the lower side of the base 32. The support 38 contains a centrally-located opening 44 which constitutes an axial extension of the inner side of the cartridge 30 providing communication between the inner side of the cartridge 30 and the chamber 46 defined by the conical portion 20 at the lower end of the housing 10.

The upper end of the cartridge 30 is supported by a spacer member 48 in concentric relation with the upper end of the chamber 12. The lower side of the spacer is provided with a nipple 50 which extends into the open end of the cartridge. The spacer member 48 is held yieldably engaged with the upper end of the cartridge by a spring washer 52 of annular configuration disposed between its upper side and the inner side of the cover plate 16.

The filter assembly further comprises a plurality of annular permanent magnets 54 disposed about the tubular cartridge 30 in vertically-spaced relation and supported in said vertically-spaced relation by a plurality of annular, non-magnetic spacers 56. The non-magnetic spacers 56 contain radially-disposed openings 58 and the tubular cartridge 30 contains diametrically-disposed, elongate slots 60—60. The interior of the tubular cartridge is in communication with the interior of the chamber 12 by way of the radial openings 58.

Additionally, the filter assembly comprises a rigid, perforated sleeve 62 disposed about the assembly of permanent magnets and spacers containing a plurality of apertures 64. The sleeve 52 is of larger inside diameter than the outside diameters of the magnets and spacers and provide an annular space 66 between it and the magnets and spacers and of a smaller outside diameter than the inside diameter of the chamber 12 so as to provide a space 68 between it and the inside diameter of the chamber 12. The lower end of the sleeve is recessed into the support 38 so as to hold it in concentric relation to the magnets and spacers and the upper end is recessed into the spacer 48 to hold the upper end in concentric relation with the magnets and spacers.

A tubular sleeve 70 comprised of a fabric of woven or unwoven composition is disposed at the inner side of the perforated sleeve 62 in the space 66 in engagement with the inner side of the perforate sleeve with its lower and upper ends 72 and 74 folded over the ends of the sleeve recessed into the support 38 and spacer 48. The folded ends are held clamped in position by pressure exerted by the spring 52 which yieldably depresses the spacer 48 toward the support 38.

As thus structured, the fluid, for example, oil to be filtered is introduced through the coupling 28 at the lower end of the module, flows upwardly through the opening 44 and into the tubular cartridge 30 and from thence through the slots 60—60 therein radially outwardly through the holes 68 in the spacers 56 and from thence through the sleeve 70 and the perforations 64 in the sleeve 62 into the space 58, and out through the passage 22 and coupling 24.

The permanent magnets 54 serve to trap metal particles and hold them. The oil cleansed of metal particles passes through the spacers 38. The fabric sleeve 62 traps non-magnetic particles such as carbon, silicates and the like. As a consequence, oil exiting through the opening 22 is clear of both metal and non-magnetic particles which constitute the sludge generally contained within oil which is used for lubricating purposes in combustion engines and transmissions of such engines.

The efficiency of the aforesaid structure as described is so effective that oil can be used as long as 100,000 miles before it need be removed, in contrast to conventional filters which must be changed every 2 or 3 thousand miles of use. Further, when the module has been used to the extent referred to, it need not be thrown away, but can be readily cleaned and re-used by disassembling the structure, removing the magnets and spacers so as to enable cleaning the particles of metal clinging to the magnets and washing the fabric of the sleeve to remove non-magnetic particles or simply replacing the sleeve with a new sleeve. Since the fabric of the sleeve is relatively inexpensive, the module may be retrofitted for renewed use at a minimal cost.

In order to prevent accidental stoppage of the flow of oil in the lubrication system of the vehicle and, hence, damage to the motor or transmission due to clogging of the module, there is provided a bypass from the tubular cartridge 30 directly to the chamber 68 and from thence through the opening 22. The bypass is provided for by a passage 76 formed in the nipple 50, one end of which is in communication with the interior of the cartridge and the other end of which is in communication with a recess 78 in the spacer 48, the upper end of which is in communication with the chamber 68 by way of the space 80 between the upper end of the spacer 48 and the underside of the cover 16. A cup-shaped closure 82 is held over the upper end of the passage 76 at the bottom of the recess 78 by a spring 84, one end of which bears on the inner side of the cup and the other end of which is held in compressive engagement with the spring by a plate 86 constrained by a spring ring 88. As thus constructed, excessive pressure of oil in the tubular cartridge 30 resulting from clogging of the perforated spacers and/or the sleeve will displace the cup 82 away from the upper end of the passage 76 and allow the oil to flow through into the space space 80 and into the space 68 and out through the opening 22.

As shown in FIG. 5, the module as thus described may be coupled by suitable flexible tubing to the crankcase and transmission of an engine for filtering of the oil.

While the module as herein illustrated is shown as comprised of metal, the housing being comprised of steel and the spacers and sleeves of aluminum, it is within the scope of the invention to construct the housing and spacers of a suitable plastic.

It should be understood that the present disclosure is for the purpose of illustration only and includes all modifications or improvements which fall within the scope of the appended claims.

What is claimed is:

1. A filter module comprising a housing defining an enclosure, a filter element supported in the enclosure comprising an elongate cartridge of uniform cross section defining a chamber open at one end and closed at the other end, at least two slots longitudinally of the cartridge at diametrically-opposed sides of the longitudinal axis, a plurality of permanent magnets disposed about the cartridge in longitudinally-spaced relation, a plurality of non-magnetic spacers disposed about the cartridge between the permanent magnets, said spacers defining annular spaces circumferentially of the cartridge between magnets and containing openings in communication at their inner ends with said annular spaces and at their outer ends with the surrounding enclosure, a rigid, perforate sleeve disposed about the magnets and spacers of such cross section as to provide an annular gap between the perforate sleeve and the magnets and a porous fabric sleeve disposed in said gap in contact with the inner side of the perforate sleeve, means at one end of the enclosure for delivering fluid into the open end of the cartridge and means intermediate the ends of the enclosure through which fluid passing through the filter can be withdrawn from the enclosure.

2. A filter module according to claim 1 wherein said rigid perforate sleeve is a metal sleeve containing a plurality of perforations.

3. A filter module according to claim 1 wherein said porous fabric sleeve is comprised of woven material.

4. A filter module according to claim 1 wherein said porous fabric sleeve is a felted material.

5. A filter module according to claim 1 wherein said porous fabric sleeve is a napped material.

6. A filter module according to claim 1 wherein the enclosure is in the form of a cylinder and there is a coupling at one end of the cylinder providing for introducing oil into the cartridge and a conductor intermediate the ends of the cylinder through which filtered oil can be removed.

7. A filter module according to claim 1 wherein there is a bypass valve at one end of the cartridge yieldable at a predetermined pressure to permit oil to bypass the filter element.

* * * * *